United States Patent
Piermee

(10) Patent No.: US 9,021,743 B2
(45) Date of Patent: May 5, 2015

(54) DEVICE TO ASSIST THE OPENING OF A COVERING ELEMENT PIVOTABLY MOUNTED RELATIVE TO AN EDGE OF A FRAME

(75) Inventor: Alexandre Piermee, Prix les Mezieres (FR)

(73) Assignee: EJ Emea, Meru Cedex (FR)

( * ) Notice: Subject to any disclaimer, the term of this patent is extended or adjusted under 35 U.S.C. 154(b) by 17 days.

(21) Appl. No.: 14/003,595

(22) PCT Filed: Mar. 8, 2012

(86) PCT No.: PCT/FR2012/050490
§ 371 (c)(1),
(2), (4) Date: May 5, 2014

(87) PCT Pub. No.: WO2012/120239
PCT Pub. Date: Sep. 13, 2012

(65) Prior Publication Data
US 2014/0230330 A1    Aug. 21, 2014

(30) Foreign Application Priority Data

Mar. 9, 2011 (FR) ...................................... 11 51944

(51) Int. Cl.
*E05F 1/00*    (2006.01)
*E05F 1/10*    (2006.01)
(Continued)

(52) U.S. Cl.
CPC ............ *E05F 1/105* (2013.01); *E02D 29/1418* (2013.01); *E05F 1/1058* (2013.01); *E06B 5/01* (2013.01); *E05Y 2201/474* (2013.01); *E05Y 2201/686* (2013.01); *E05Y 2900/612* (2013.01)

(58) Field of Classification Search
CPC .......... E05F 1/105; E05F 1/1058; E06B 5/01; E02D 29/1418

USPC .......... 49/386, 387, 400; 16/197, 71, 72, 286, 16/289, 291, 293, 400
See application file for complete search history.

(56) References Cited

U.S. PATENT DOCUMENTS 4,137,669 A * 2/1979 Nunlist ........................... 49/386
4,545,322 A * 10/1985 Yang ............................... 188/67
(Continued)

FOREIGN PATENT DOCUMENTS

DE    2829145    1/1980
DE    3415343    11/1985
(Continued)

OTHER PUBLICATIONS

International Search Report and Written Opinion of the International Searching Authority for International Application No. PCT/FR2012/050490 mailed May 29, 2012.

*Primary Examiner* — Jerry Redman
(74) *Attorney, Agent, or Firm* — Warner Norcross & Judd LLP

(57) ABSTRACT

A device is provided to assist the opening of a covering element pivotably mounted relative to an edge of a frame. The device includes an assistance cylinder (6). The assistance cylinder (6) includes a hollow shaft (7), a guide pin (10) inserted in the hollow shaft (7) and comprising at the end thereof opposite the end wall (8) of the hollow shaft (7) a yoke (11), a spring (13) inserted in the hollow shaft (7) surrounding the guide pin (10) and mounted pre-stressed when unloaded between the end wall (4) of the hollow shaft (7) and the yoke (11) of the guide pin (10), and a screw (14) secured to the end of the guide pin (10) and engaging with the end wall (8) of the hollow shaft (7) for keeping the pre-stressed spring (13) in the released state thereof. The invention is useful in the field of road systems.

18 Claims, 6 Drawing Sheets

(51) Int. Cl.
*E02D 29/14* (2006.01)
*E06B 5/01* (2006.01)

(56) References Cited

U.S. PATENT DOCUMENTS 5,134,805 A * 8/1992 Frantzen et al. ............... 49/386
5,205,073 A * 4/1993 Lyons, Sr. ..................... 49/386
5,401,096 A * 3/1995 Stang ......................... 312/319.2
6,021,606 A * 2/2000 Kos ............................... 49/386
6,560,931 B1 * 5/2003 Cermola ........................ 49/386
8,166,706 B2 * 5/2012 Slimak et al. ................. 49/386
2014/0223692 A1 * 8/2014 Adoline ........................ 16/72

FOREIGN PATENT DOCUMENTS

FR         2812008         1/2002
GB         2226361 A * 6/1990 ............ E05F 1/10
JP         06104579 A * 4/1994 ............ H05K 5/03

* cited by examiner

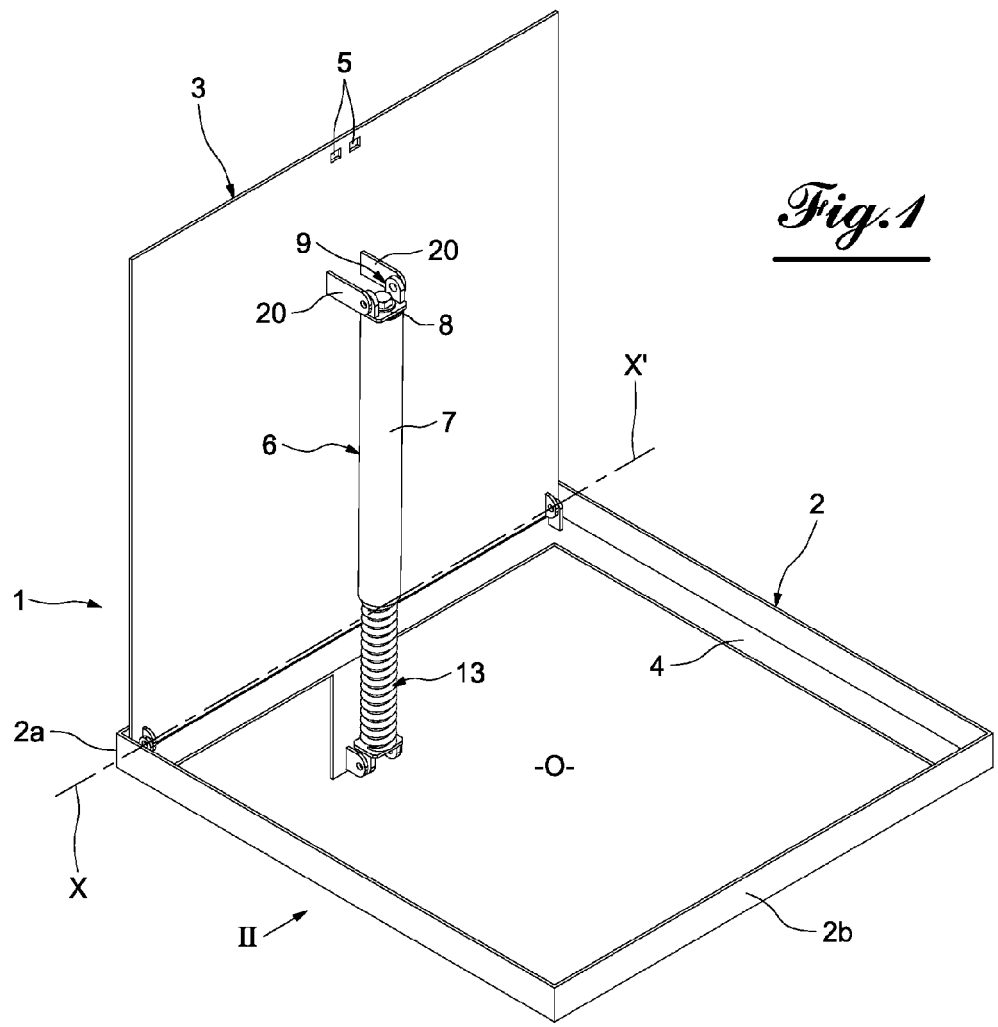
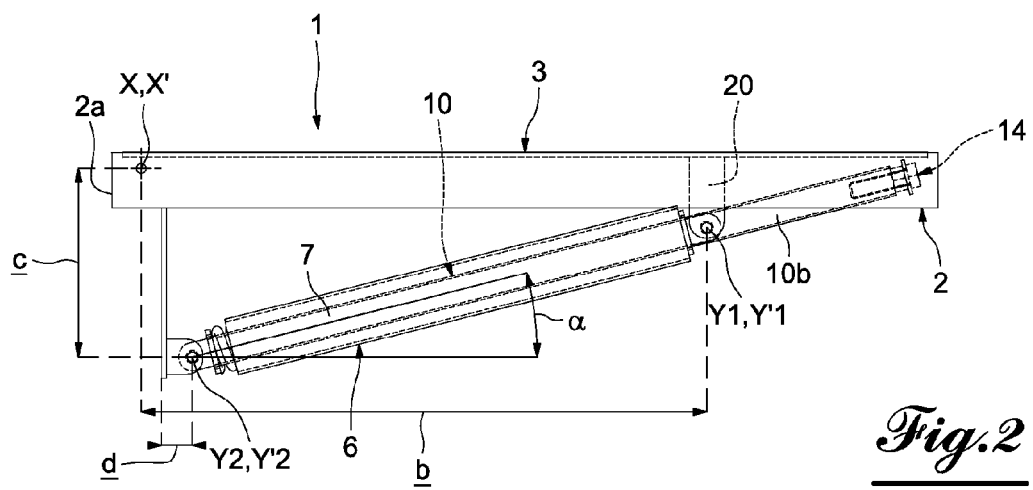

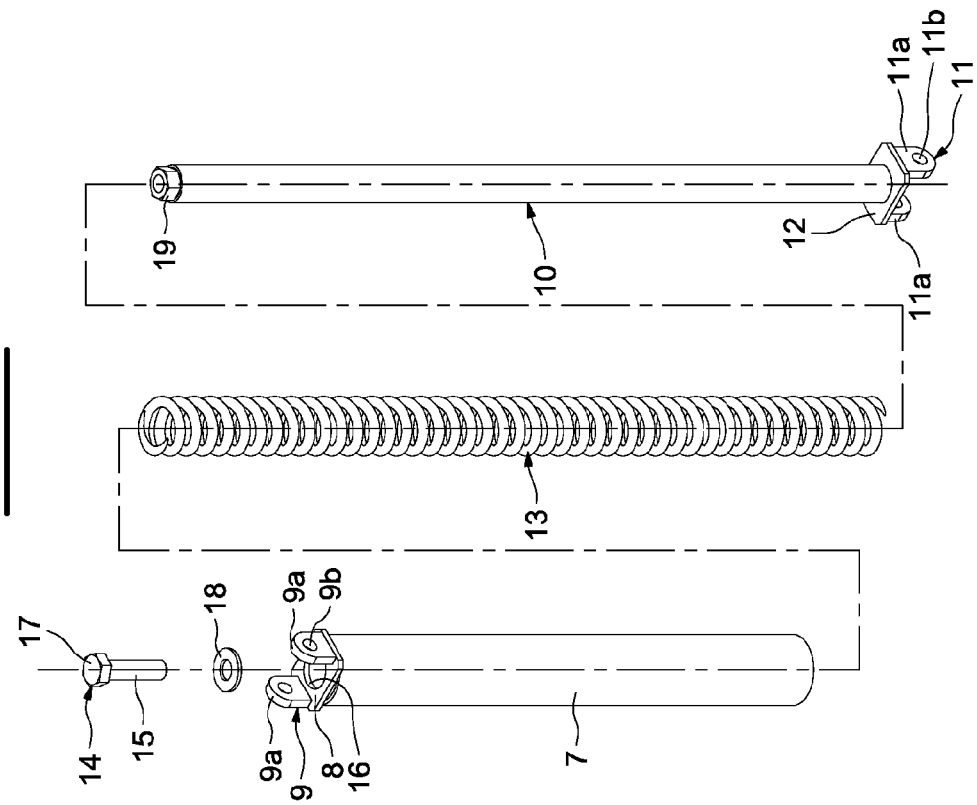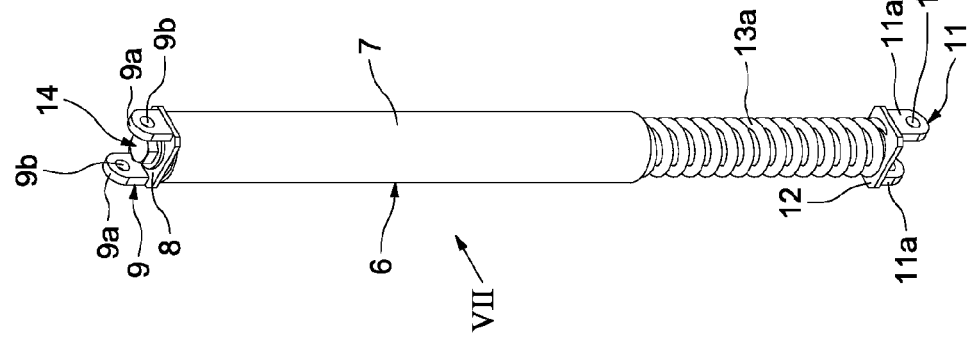

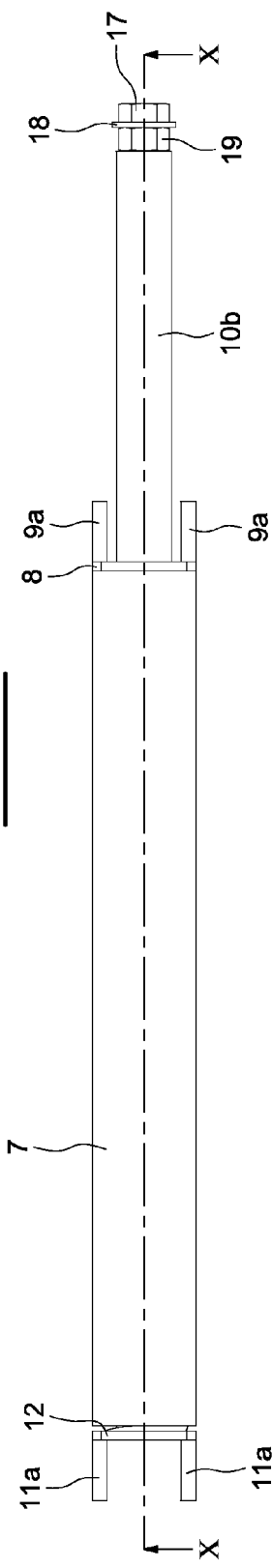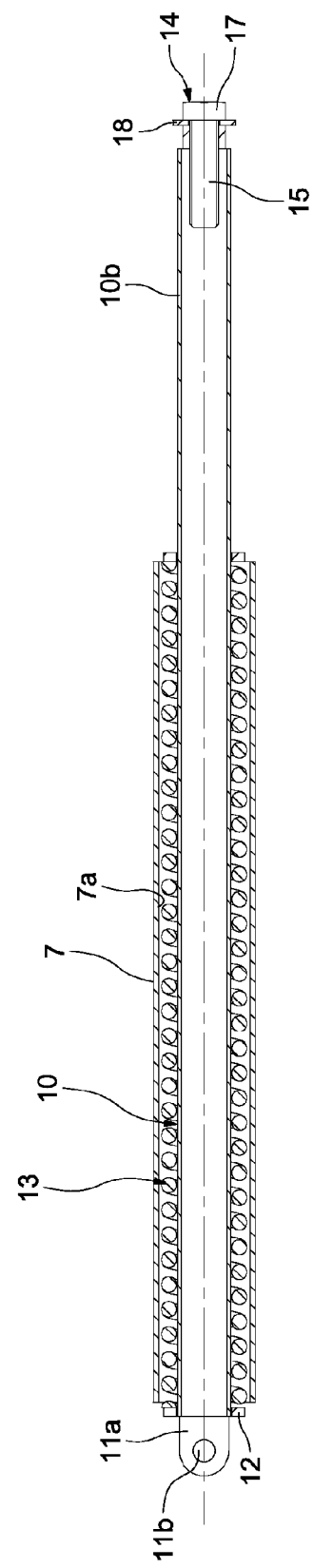

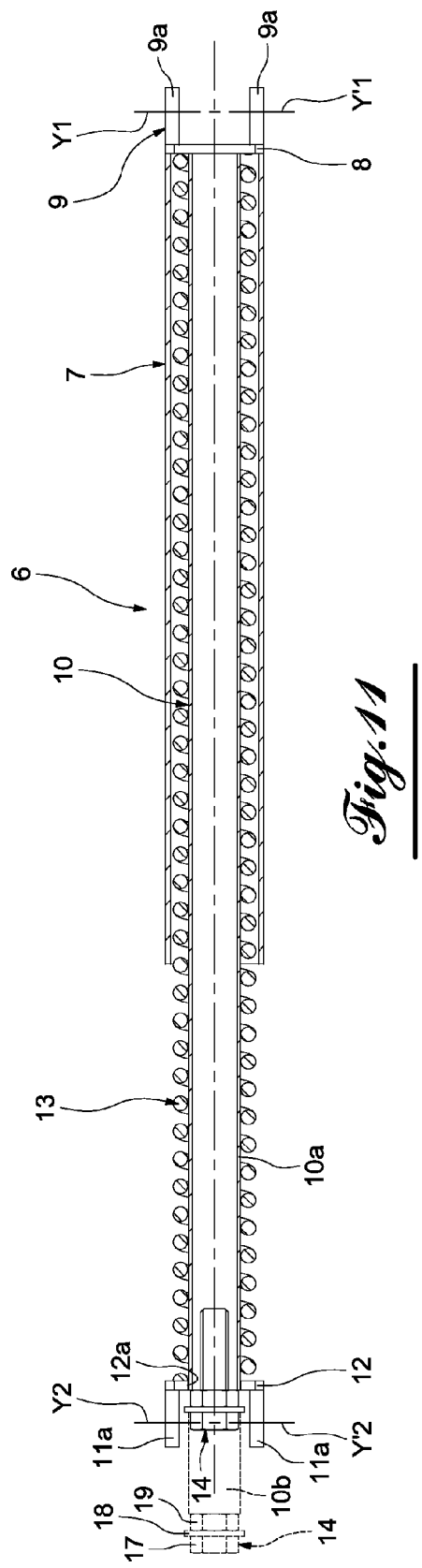

DEVICE TO ASSIST THE OPENING OF A COVERING ELEMENT PIVOTABLY MOUNTED RELATIVE TO AN EDGE OF A FRAME

The present invention relates to a device to assist the opening of a covering element, such as a hatch, a plug or a lid, pivotally mounted relative to an edge of a frame between a lowered position for closing the frame and a raised position for opening this frame.

In particular, but in a non-limiting way, it applies to a roadway device, the covering element of which occupying its raised position clears the opening of the frame for accessing a manhole for visiting or inspecting an underground network.

Such assistance devices are known, which comprise actuators which are each interposed between the covering element and the edge of the frame of a roadway device.

Each assistance actuator may be of the gas type or of a type comprising two concentrically accommodated springs one inside the other in the cylinder of the actuator while being mounted pre-stressed when unloaded between an end wall of the cylinder and a piston which is mounted and slideably guided in the cylinder, and secured to the end of the actuator rod.

If such gas or spring actuators give satisfaction for assisting the operator upon opening the covering element from its frame closure position, they are relatively expensive and of extremely complex structure especially as regards the spring actuators. Further, the spring actuator also has the drawback of not providing a large assisting amplitude upon pivoting the covering element from its closing position to the position for opening the frame.

The object of the invention is to overcome the above drawbacks of known assistance devices.

For this purpose, according to the invention, the device to assist the opening of a covering element such as a hatch, a plug or a lid, pivotally mounted relative to an edge of the frame between a lowered position for closing the frame and a raised position for opening this frame, comprising at least one spring actuator connected in a jointed or hinged way through its ends to the covering element and to the edge of the frame respectively, is characterized in that the actuator comprises a hollow shaft, one end wall of which includes an external yoke connected in a jointed way to the covering element or to the edge of the frame, a guide pin or rod accommodated in the hollow shaft surrounding the guide pin and connected at its opposite ends to the end wall of the hollow shaft to the edge of the frame or to the covering element through a jointed yoke, a spring accommodated in the hollow shaft surrounding the guide pin and being pre-stressed in the unloaded state between the end wall of the hollow shaft and the yoke of the guide pin on the one hand, a length portion of which protrudes from the hollow shafts, when the covering element occupies its raised opening position and compressed in the hollow shaft between the end wall of the hollow shaft and the yoke of the guide pin on the other hand, when the covering element occupies its lowered closing position, and a means secured to one of the ends of the guide pin for retaining the pre-stressed spring in the unloaded state, and in that, during the assisted opening of the covering element by the spring actuator, the compressed spring is released for causing guided sliding of the hollow shaft by the guide pin.

Preferably, the jointed yoke is secured to the end of the guide pin and the end wall of the hollow shaft includes an orifice for letting through the guide pin during the pivoting of the covering element between its lowered closing position and its raised opening position, and in the lowered closing position of the covering element, the guide pin protrudes from the hollow shaft through this orifice over a portion of its length whereas in the raised position for opening the covering element, the means retaining the spring secured to the end of the guide pin bears upon the end wall of the hollow shaft.

Advantageously, the means for retaining the spring comprises a screw, a nut secured to the end of the guide pin and in which the screw is anchored, and a washer interposed between the screw head and the nut and bearing upon the end wall of the hollow shaft in the raised position of the covering element.

Advantageously, the spring is concentrically mounted to the guide pin and to the hollow shaft while being in contact with the peripheral internal face of the hollow shaft.

The axis for jointing the yoke of the hollow shaft with the covering element and the axis for jointing the yoke of the guide pin with the edge of the frame are parallel to the jointing axis of the covering element, the jointing axis of the yoke of the guide pin is located at a fixed distance below the jointing axis of the covering element and the distance separating both jointing axes of both hollow shafts gradually increases as the covering element pivots from its lowered closing position to its raised opening position.

Preferably, the jointing yoke of the hollow shaft is connected through a joint to the covering element via another yoke secured perpendicularly to the internal face of the covering element and the jointing yoke of the guide pin is connected through a joint to the edge of the frame via another yoke secured perpendicularly to a plate itself secured to the edge of the frame while extending under the yoke perpendicularly to the plane of the latter.

In the lowered closing position of the covering element, the length portion of the guide pin protrudes from the hollow shaft under the covering element.

Advantageously, the jointing yoke and the end wall of the hollow shaft are made in a single piece welded to the hollow shaft and the jointing yoke of the guide pin is attached by welding to the end of the latter.

The spring actuator substantially extends in the middle plane of the frame perpendicular to the latter.

The frame is rectangular and the covering element fits into the frame at its lowered closing position.

The invention is also directed to a spring actuator intended for assisting the opening of a covering element, such as a hatch, a plug or a lid, pivotally mounted relatively to an edge of the frame and characterized in that it comprises a hollow shaft, an end wall of which includes an external yoke intended to be connected through a joint to the covering element or to the edge of the frame, a guide pin accommodated in the hollow shaft and including at its end opposite to the end of wall of the hollow shaft a yoke intended to be connected to the edge of the frame or to the covering element, a spring accommodated in the hollow shaft surrounding the guide pin and being mounted pre-stressed in the unloaded state between the end wall of the hollow shaft and the yoke of the guide pin, a portion of the length of which protrudes from the hollow shaft, and a means secured to the end of the guide pin close to the end wall of the hollow shaft while bearing upon this wall in order to retain the pre-stressed spring in the unloaded state.

Advantageously, the means for retaining the spring comprises a screw, a nut secured to the end of the guide pin and in which the screw is anchored, and a washer interposed between the screw head and the nut and bearing upon the end wall of the hollow shaft.

The spring is concentrically mounted to the guide pin and to the hollow shaft while being in contact with the peripheral internal face of the hollow shaft.

The end wall of the hollow shaft includes an orifice for letting through the guide pin.

The jointing yoke and the end wall of the hollow shaft are made in a single piece welded to the hollow shaft and the jointing yoke of the guide pin is attached by welding to the end of the latter.

The invention is finally directed to a piece of roadway equipment comprising a covering element, such as a hatch, a plug or a lid, pivotally mounted relatively to an edge of a frame, and which is characterized in that it comprises a device to assist the opening of the covering element, as defined earlier.

The invention will be better understood, and other objects, features, details and advantages thereof will become more clearly apparent in the explanatory description which follows made with reference to the appended drawings, only given as an example illustrating two embodiments of the invention and wherein:

FIG. 1 is a perspective view of an assembly with a covering element, a frame for supporting this element and an assistance actuator according to a preferred embodiment of the invention, the covering element occupying its raised position for opening the frame;

FIG. 2 is a side view along the arrow II of FIG. 1 and showing the assistance actuator in its position corresponding to the lowered position for closing the covering element;

FIG. 5 is a perspective view of the assistance spring actuator in the assembled position, the spring of this actuator being unloaded;

FIG. 6 is an exploded perspective view of the assistance spring actuator of FIG. 5;

FIG. 9 is a side view similar to the one of FIG. 7 and illustrating the spring of the assistance actuator in the completely compressed state;

FIG. 10 is a sectional view along the line X-X of FIG. 9; and

FIG. 11 is a view illustrating another embodiment of the assistance spring actuator of the invention.

Figure 3:
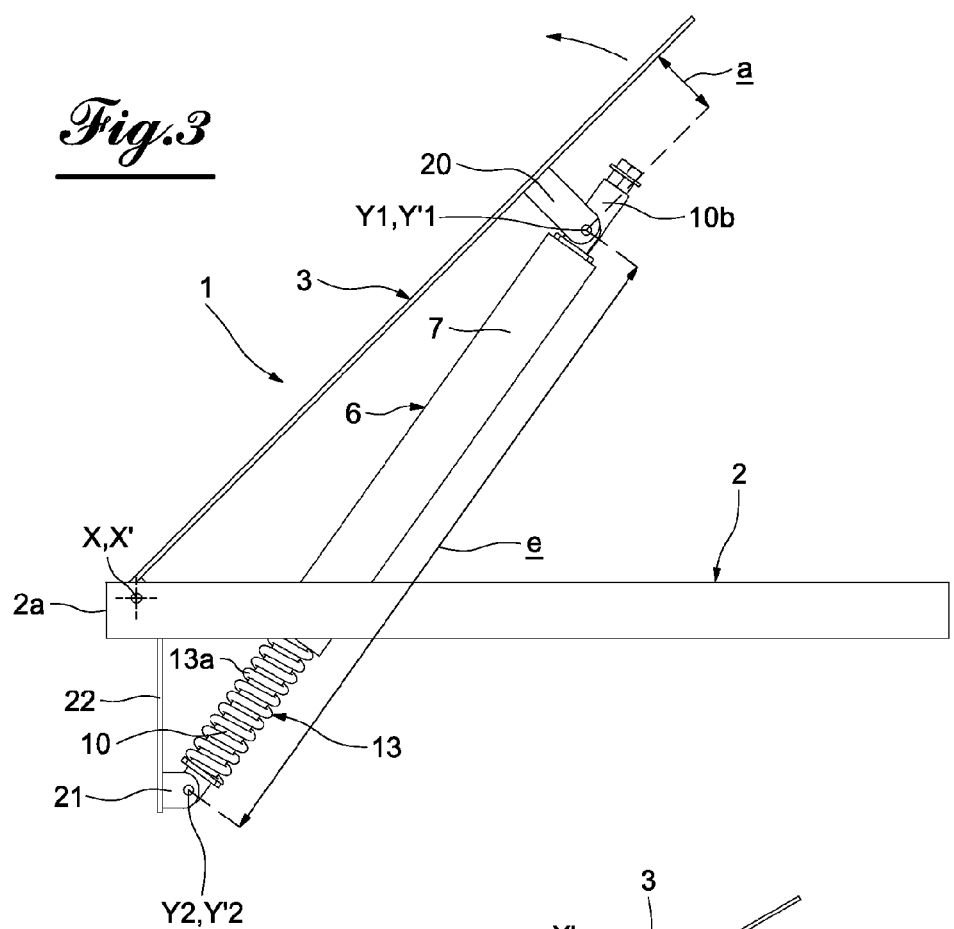
FIG. 3 is a side view similar to the one of FIG. 2 and illustrating the assistance actuator in its position corresponding to an intermediate opening position of the covering element.
Figure 4:
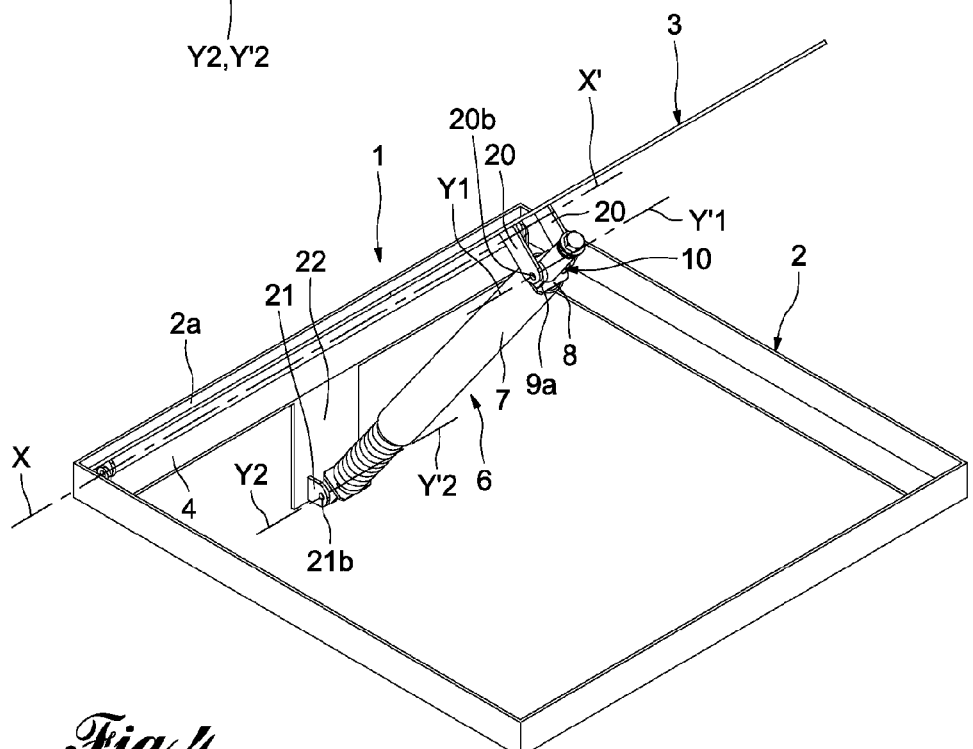
FIG. 4 is an enlarged perspective view of FIG. 3.

Referring to FIGS. 1 to 10, reference 1 designates a roadway device, which comprises a frame 2 secured to the ground or to a roadway and a covering element 3 such as a hatch, a plug, a lid or the like.

In the present case, the frame 2 is of a rectangular shape and the covering element 3 also with a rectangular shape, is mounted jointed along one 2a of the edges or sides of the frame 2 around a pivot axis XX' for allowing the covering element 3 to pivot between a lowered position for closing the opening O of the frame 2, in which the covering element 3 fits into the frame 2, and a raised or standing opening position allowing the opening of the frame 2 to be cleared in order to access a manhole for visiting or inspecting an underground network.

As an example, the covering element is plate-shaped and, like the frame 2, may be made in metal, such as steel.

FIG. 1 illustrates the raised position for opening the covering element 3 which extends substantially perpendicularly to the plane of the frame 2 passing through the sides of the latter and FIG. 2 illustrates the covering element 3 in its lowered position for closing the frame 2. In this latter position, the covering element 3 bears upon a supporting internal peripheral wall 4 of the frame 2.

Locking means, not shown, are provided for locking the covering element 3 to the frame 2 in its lowered closing position in this frame. These locking means may comprise a bolt lock secured to the covering element 3 in the vicinity of its edge opposite to the jointing axis XX' in proximity to the location symbolized in FIG. 1 by two drill holes 5 and a striker secured to the edge or side 2b of the frame 2 opposite to the side 2a. Such a lock is lockable or unlockable by means of a suitable wrench in order to engage the bolt of the lock into the striker of the frame 2 or disengage it from this striker. The drill holes 5 give the possibility of letting through an end hook of a bar for lifting the covering element 3 in order to bring it into its opening position.

The roadway device 1 is equipped with a spring actuator 6 interposed between the covering element 3 and the frame 2 and providing assistance to an operator for pivoting the covering element 3 from its lowered position for closing the frame 2 to its raised position for opening this frame.

According to the preferred embodiment of FIGS. 1 to 10, the spring actuator 6 comprises a cylindrical hollow shaft 7, one end of which is closed by a wall 8 from which two rigid parallel branches 9a forming a yoke connected through a joint to the internal face of the covering element 3 protrude exteriorly and perpendicularly. Preferably, the wall 8 and the branches 9a of the yoke 9 are made in a single piece which is attached to the end of the hollow shaft 7 of the actuator 6 by welding.

The assistance actuator 6 further comprises an interiorly hollow cylindrical rigid pin 10 accommodated in the hollow shaft 7 and which includes at its end opposite to the end wall 8 of the hollow shaft 7 and outside the latter a yoke 11 with two parallel rigid branches 11a secured to a plate 12 exteriorly and perpendicularly to the latter and which is attached, for example by welding, to the end of the pin 10. The plate 12 is positioned perpendicularly to the pin 10.

Figure 7:
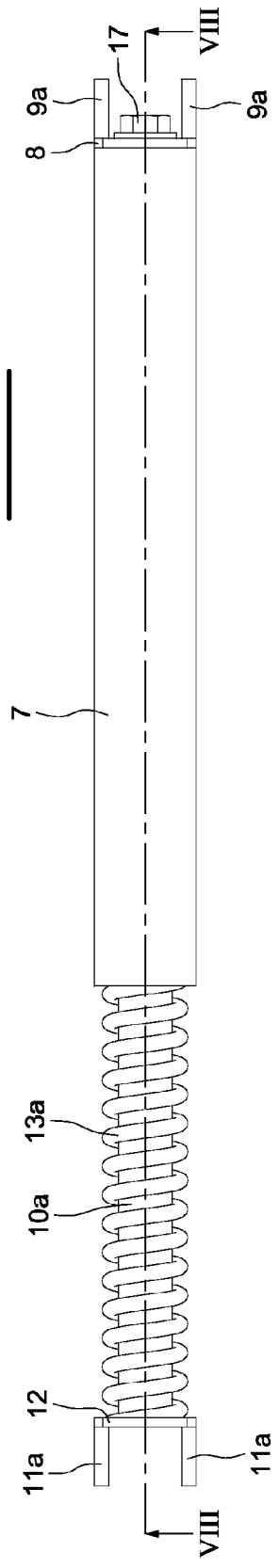
FIG. 7 is a side view along the arrow VII of FIG. 5.
Figure 8:
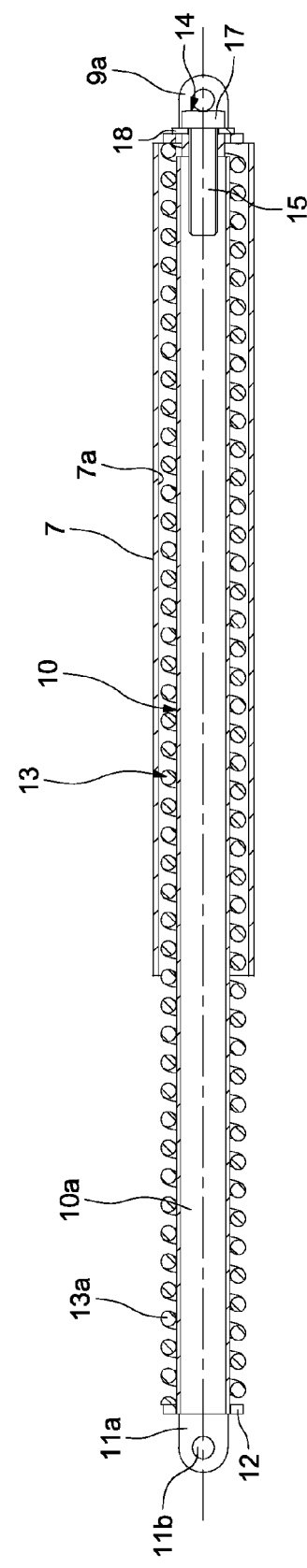
FIG. 8 is a sectional view along the line VIII-VIII of FIG. 7.

The actuator 6 also comprises a spring 13, of the compression coil type, accommodated in the hollow shaft 7 surrounding the pin 10 and being mounted pre-stressed in the unloaded state, not compressed, as notably illustrated in FIGS. 5, 7 and 8, between the end wall 8 of the hollow shaft 7 and the wall 12 of the yoke 11 of the pin 10. Thus, in the unloaded state, the spring 13 extends all along the pin 10 and includes an external portion 13a surrounding the corresponding external pin portion 10a of the pin 10 protruding from the hollow shaft 7.

The spring 13 is concentrically mounted to the pin 10 and to the hollow shaft 7 and has its external perimeter in contact with the peripheral internal face 7a of the hollow shaft 7. In the unloaded state, the spring 13 is maintained pre-stressed between the end wall 8 of the hollow shaft 7 and the plate 12 of the pin 10 by a means preferably comprising a screw 14, the threaded portion 15 of which is anchored to the end of the pin 10 coaxially and which crosses an orifice 16 of the plate 8 coaxial with the hollow shaft 7, the head 17 of the screw 14 bearing upon the wall 8 via a washer 18.

The end of the pin 10 includes, welded to the latter, a nut 19 through which the screw 14 is screwed, the threaded portion 15 crossing the nut 19 engaging into the tubular end portion of the pin 10. Thus, the washer 18 is confined between the head 17 and the screw 14 and the nut 19. This assembly of the screw 14, washer 18 and nut 19 ensures adjustment of the pre-stress of the spring 13 in its unloaded state between the wall 8 and the plate 12 in order to avoid in this state any play in the longitudinal displacement of the spring 13 along the pin 10.

The pin 10 may partly cross the orifice 16 of the wall 8 of the hollow shaft 7 as this will be seen subsequently.

The jointing yoke 9 of the hollow shaft 7 is connected to the covering element 3 via two rigid parallel tabs 20 secured to the internal face of the covering element 3 perpendicularly to the latter, both tabs 20 thus forming a jointing yoke. More specifically, both branches 9a of the yoke 9 are positioned with small play between both tabs 20 in the vicinity of the ends of the latter and are jointedly mounted to these ends along a jointing axis Y1Y'1 parallel to the covering element 3 or to the axis XX.

The jointing of the yoke 9 to both tabs 20 is formed by two cylindrical jointing axes, not shown, extending along the axis Y1Y'1, each engaged through both coaxial drill holes 9b, 20b of a branch 9a of the yoke 9 and of a corresponding tab 20, so that such a joint cannot interfere with the passing of a portion of the pin 10 through the orifice 16 and through both branches 9a of the yoke 9.

Both branches 11a of the yoke 11 of the pin 10 are positioned with small play between two parallel rigid tabs 21 themselves forming a yoke and which are secured perpendicularly to the latter, to a plate 22 with the shape of a rigid plate itself secured to the portion of the supporting wall 4 of the frame 2 perpendicularly to the latter, i.e. perpendicularly to the plane of the frame 2 containing its four sides. The plate 22 extends under the supporting wall portion 4 of the frame 2 and the two tabs 21 are secured together in the vicinity of the lower edge of this plate.

The yoke 11 is jointed between both tabs 21 along a jointing axis Y2Y'2 parallel to the jointing axis Y1Y'1 of the yoke 9 of the hollow shaft 7. The jointing of the yoke 11 to the tabs 21 is formed by two cylindrical axes, not shown, extending along the axis Y2Y'2 and each inserted into the two coaxial drill holes 11b of a branch 11a of the yoke 11 and 21b of the corresponding tab 21.

The branches 9a of the yoke 9 of the hollow shaft 7 and the branches 11b of the yoke 11 of the pin 10 are positioned symmetrically with the longitudinal middle plane of the actuator 6 and in the assembled position of the actuator 6 between the frame 2 and the covering element 3, the actuator 6 is positioned in the middle plane of the frame 2 extending perpendicularly to the latter.

When the covering element 3 occupies its lowered position for closing the opening O of the frame 2, the spring 13 is practically completely compressed in the hollow shaft 7 between the end wall 8 of this hollow shaft and the plate 12 of the pin 10 which is found in the vicinity of the end of the hollow shaft 7 opposite to the end plate 8 as this notably emerges from FIGS. 2 and 10. FIG. 2 also shows that a length portion 10b of the pin 10 protrudes from the hollow shaft 7 through the orifice 16 of the latter and between both branches 9a of the yoke 9 with the end 10b including the screw 14, washer 18 and nut 19 assembly located below the covering element 3 in the vicinity of its edge opposite to the jointing axis XX'.

This figure also shows that the actuator 6, located largely under the frame 2, is tilted relatively to the horizontal according to a relatively small angle α, for example of about 15°.

When an operator wishes to swing the covering element from its lowered position for closing the opening O of the frame 2 to its raised position for opening the frame 2, he/she first of all actuates the lock for locking the covering element to the frame 2 in order to unlock it.

Next, he/she introduces into the drill holes 5 of the covering elements 3 the end hook of a bar, in order to lift up this element and the spring 13 then exerts, upon beginning its release, a force along the longitudinal direction of the actuator 6 from the fixed jointing yoke with an arm 21 of the plate 22 providing assistance to the operator for opening the covering element 3. As the operator gradually pivots the covering element 3 around the axis XX' towards its raised opening position, the spring 13 continuously loses its tension so as to cause sliding of the hollow shaft 7 guided by the pin 10 for exerting a force component perpendicular to the covering element 3 giving the possibility of assisting the pivoting of the covering element 3 around the axis X-X'. FIG. 3 illustrates the covering element 3 in an intermediate swinging position towards its raised opening position and shows that the actuator 6 pivots around the axis Y2Y'2 and that during this pivoting, the portion 10b of the guide tube 10, because of the sliding of the hollow shaft 7, returns to the inside of the latter with the portion 10a protruding out of the hollow shaft 7 with the corresponding portion 13a of the spring 13, the end turns of which are constantly maintained pressed, between the end wall 8 of the yoke 7 and the end wall 12 of the pin 10.

The fixed distance a of the axis Y1Y'1 relatively to the covering element 3 defined by the length of the tabs 20 and the fixed distance b of this axis relatively to the axis XX' determined by the location of the tabs 20 on the covering element 3, the fixed height c of the axis Y2Y'2 relatively to the axis XX' determined by the height of the plate 22 and the fixed distance d of the axis Y2Y'2 relatively to the axis XX' in a direction parallel to the plane of the frame 2 as well as the length of the spring 13 in the unloaded state, are such that the actuator 6 constantly assists the pivoting of the covering element 3 from its position for closing the opening O of the frame 2 to its raised opening position with an increase in the distance e separating both axes Y2Y'2 during this pivoting and resulting from the displacement of the hollow shaft 7 guided by the pin 10. It should also be noted that the distance b separating the axis Y1Y'1 from the axis XX' is greater than half the length of the recovering element 3 from the axis XX'. In the raised position for opening the covering element 3, the spring 13 is completely unloaded and slightly pre-stressed between the end wall 8 of the hollow shaft 7 and the end plate 12 of the pin 10, ensuring that the covering element 3 is maintained in this raised position. The swinging of the covering element 3 beyond its raised position of FIG. 1 is prevented by the yoke 11 which is bearing upon the plate 22.

The design of the assistance actuator 6 gives the possibility of using a spring with a very great length since it extends from the end wall 8 of the hollow shaft 7 to the end wall 12 of the pin 10, ensuring quasi complete assistance with the opening of the covering element 3.

As an example, the operator maneuvering the covering element 3 towards its opening position, because of the assistance of the spring actuator 6, will exert a force of less than 250 Newtons.

The described preferred embodiment above of the assistance actuator 6 allows it to be mounted between the covering element 3 and the plate 22 of the frame 2 while being not very cumbersome under the frame 2 when the covering element 3 occupies its lowered position for closing the opening O of this frame. Further, the actuator 6 is of extremely simple and inexpensive design while being efficient for ensuring its assistance function over the whole swinging amplitude of the covering element 3 by exerting a force allowing compensation of the weight of the covering element 3.

Further, the spring actuator 6 also ensures a damping function when swinging the recovering element 3 from its raised opening position to its closing position of the frame 2.

It should also be noted that after unlocking the lock of the covering element 3 occupying its position for closing the frame 2, the spring 13 may be tared for exerting a force causing slight pivoting of the covering element 3 to a half-open position of its edge opposite to the jointing axis XX' in order to allow the operator to more easily grip the covering element 3 and to have it swing with assistance from the actuator 6 towards its raised opening position.

According to an alternative embodiment not shown, the mounting of the assistance actuator 6 may be reversed, i.e. the yoke 9 of the end wall 8 of the hollow shaft 7 would be mounted between both tabs 21 of the plate 22 and the end yoke 11 of the pin 10 would be mounted and jointed between both tabs 20 of the covering element 3. In this case, when the covering element 3 will occupy its position for closing the frame 2, the portion 10b of the pin 2 will obliquely protrude according to the same angle α as in FIG. 2 beyond the plate 22 which will be cut out for this purpose in order to let through the portion 10b of this pin. The drawback of such an assembly is that it is necessary to dig a chimney or underground tunnel of a larger width in order to receive the portion 10b of the pin 10 in the closing position of the covering element 3.

FIG. 11 illustrates another embodiment of the assistance actuator 6.

According to this embodiment, the guide pin 10 for sliding the hollow shaft 7 has its upper end secured to the end plate 8 of the hollow shaft 7, for example by welding, the branches 9a of the yoke 9 of the hollow shaft 7 being mounted and jointed along the axis Y1Y'1 between both tabs 20 as in the first preferred embodiment.

Further, the yoke 11, which is also mounted and jointed along the axis Y2Y2' between both tabs 21 of the plate 22, like in the first preferred embodiment, is secured to the plate 12 which includes a central orifice 12a for letting through a portion of the guide pin 10.

The free end of the guide pin 10 opposite to the end wall 8 of the hollow shaft 7 includes the same screw 14, washer 18 and nut 19 assembly as the one of the first preferred embodiment and it will therefore not be again detailed except that it ensures the function for retaining the spring 13 in the unloaded state slightly pre-stressed between the plate 12 and the end wall 8 of the hollow shaft 7.

When the covering element 3 occupies its position for closing the frame 2 illustrated in FIG. 2, the spring 13 is practically completely compressed between the end wall 8 of the hollow shaft 7 and the plate 12 of the yoke 11 and a portion 10b of the guide pin 10 protrudes through the orifice 12a beyond the plate, not shown, according to an angle identical with the angle α of FIG. 2, as illustrated in dotted lines in FIG. 11.

The operation of the actuator 6 for assisting the operator with the opening of the covering element 3 towards its raised position is similar to the one of the assistance actuator 6 of the first preferred embodiment and will therefore not be detailed again except that the gradual release of the spring during the pivoting of the covering element 3 towards its raised position for the opening causes guided sliding of the hollow shaft 7 with the pin 10 for exerting the force assisting the covering element until the latter occupies its corresponding raised position at the position of the actuator 6 as illustrated in solid lines in FIG. 11.

Of course, the plate 22 will be cut out at its lower portion in order to let through the pin portion 10b to the closing position of the covering element 3 in the frame 2.

The drawback of this second embodiment is that it is necessary to make a chimney of larger width contrary to the first preferred embodiment.

Various embodiment alternatives may be provided without departing from the scope of the present invention.

Thus, it is possible to provide two side assistance actuators 6, each being preferably identical with the one of the first embodiment.

Further, the frame 2 may have a shape other than a rectangular shape, for example a circular shape.

The assistance actuator of the invention described above thus allows for a spring of very great length with which it is possible to obtain a very large amplitude assisting the actuator upon opening the covering element with which it is associated. Further, the assistance actuator of the invention is of an extremely simple structure making its manufacturing and its mounting more rapid and is less expensive than gas actuators and dual spring actuators which have been used up to now.

The invention claimed is:

1. A device for assisting the opening of a covering element (3) pivotally mounted relative to an edge (2a) of a frame (2) between a lowered position for closing the frame (2) and a raised position for opening the frame, comprising at least a spring actuator (6) including two ends, the two ends of which are connected and jointed respectively with the covering element (3) and with the edge (2a) of the frame (2), characterized in that the actuator (6) comprises a hollow shaft (7), an end wall (8) of which includes an external yoke (9) connected and jointed with the covering element (3) or with the edge (2a) of the frame (2), a guide pin (10) accommodated in the hollow shaft (7) and connected at its end opposite to the end wall (8) of the hollow shaft (7) to the edge (2a) of the frame (2) or to the covering element (3) through a jointing yoke (11), a spring (13) accommodated in the hollow shaft (7) while surrounding the guide pin (10), said spring (13) being pre-stressed in an unloaded state all along the guide pin (10) between the end wall (8) of the hollow shaft (7) and the yoke (11) of the guide pin (10), a length portion (10a) of which protrudes from the hollow shaft (7), when the covering element (3) occupies its raised opening position, and said spring (13) being compressed in the hollow shaft (7) between the end wall (8) of the hollow shaft (7) and the yoke (11) of the guide pin (10) when the covering element (3) occupies its lowered closing position, and a means (14) secured to one of the ends of the guide pin (10) for retaining the spring (13) pre-stressed in the unloaded state, and in that, during the assisted opening of the covering element (3) by the spring actuator (6), the spring (13) is released in order to cause guided sliding of the hollow shaft (7) by the guide pin (10).

2. The assistance device according to claim 1, characterized in that the jointing yoke (11) is secured to the end of the guide pin (10) and the end wall (8) of the hollow shaft (7) includes an orifice (16) for letting through the guide pin (10) upon pivoting of the covering element (3) between its lowered closing and raised opening positions, in that in the lowered position for closing the covering element (3), the guide pin (10) protrudes from the hollow shaft (7) through the orifice (16) over a portion (10b) of its length and in that in the raised position for opening the covering element, the means (14) for retaining the spring (13) secured to the end of the guide pin (10) bears upon the end wall (8) of the hollow shaft (7).

3. The assistance device according to claim 2, characterized in that the means for retaining the spring (13) comprises a screw (14), a nut (19) secured to the end of the guide pin (10) and in which the screw (14) is anchored, and a washer (18) interposed between the screw head (17) and the nut (19) and bearing upon the end wall (8) of the hollow shaft (7) in the raised position of the covering element (3).

4. The assistance device according to claim 2, characterized in that the jointing yoke (9) of the hollow shaft (7) is connected and jointed to the covering element (3) through another yoke (20) perpendicularly secured to the internal face of the covering element (3) and the jointing yoke (11) of the guide pin (10) is connected and jointed with the edge (2a) of the frame (2) through another yoke (21) perpendicularly secured to a plate (22) which is secured to the edge (2a) of the frame (2) while extending under the frame (2) perpendicularly to the plane of the frame.

5. The assistance device according to claim 4, characterized in that in the lowered position for closing the covering element (3), the length portion (10a) of the guide pin (10) protrudes from the hollow shaft (7) under the covering element (3).

6. The assistance device according to claim 1, characterized in that the spring (13) is concentrically mounted to the guide pin (10) and to the hollow shaft (7) while being in contact with the peripheral internal face (7a) of the hollow shaft (7).

7. The assistance device according to claim 1, characterized in that the axis (Y1Y'1) for jointing the yoke (9) of the hollow shaft (7) with the covering element (3) and the axis (Y2Y'2) for jointing the yoke (11) of the guide pin (10) with the edge (2a) of the frame (2) are parallel to the jointing axis (XX') of the covering element, the jointing axis (Y2Y'2) is located at a fixed distance below the jointing axis (XX') and the distance separating both jointing axes (Y1Y'1) and (Y2Y'2) gradually increases as the covering element (3) pivots from the lowered closing position to the raised opening position.

8. The assistance device according to claim 1, characterized in that the jointing yoke (9) and the end wall (8) of the hollow shaft (7) are made as a single piece welded to the hollow shaft (7) and the jointing yoke (11) of the guide pin (10) is fixed by welding to the end of the guide pin (10).

9. The assistance device according to claim 1, characterized in that the spring actuator (6) substantially extends into the middle plane of the frame (2) and perpendicular to the frame (2).

10. The assistance device according to claim 1, characterized in that the frame (2) is rectangular and the covering element (3) is included in the frame (2) in the lowered closing position of the covering element (3).

11. The spring actuator according to claim 10, characterized in that the jointing yoke (9) and the end wall (8) of the hollow shaft (7) are made in a single piece welded to the hollow shaft (7) and the jointing yoke (11) of the guide pin (10) is fixed by welding to the end of the latter.

12. The assistance device according to claim 1, characterized in that the covering element (3) is a lid.

13. A spring actuator (6) intended for assisting the opening of a covering element (3) pivotally mounted relatively to an edge (2a) of a frame (2), characterized in that the spring actuator (6) comprises a hollow shaft (7), an end wall (8) of which includes an external yoke (9) intended to be connected and jointed with the covering element (3) or with the edge (2a) of the frame (2), a guide pin (10) accommodated in the hollow shaft (7) and including at one end opposite to the end wall (8) of the hollow shaft (7) a yoke (11) intended to be connected to the edge (2a) of the frame (2) or to the covering element (3), a spring (13) accommodated in the hollow shaft (7) while surrounding the guide pin (10) and being mounted pre-stressed in an unloaded state all along the guide pin (10) between the end wall (8) of the hollow shaft (7) and the yoke (11) of the guide pin (10), a length portion (10a) of which protrudes from the hollow shaft (7), and a means secured to the end of the guide pin (10) close to the end wall (8) of the hollow shaft (7) while bearing upon the end wall for retaining the pre-stressed spring (13) in the unloaded state.

14. The spring actuator according to claim 13, characterized in that the means for retaining the spring (13) comprises a screw (14), a nut (19) secured to the end of the guide pin (10) and in which the screw (14) is anchored, and a washer (18) interposed between the screw head (17) and the nut (19) and bearing upon the end wall (8) of the hollow shaft (7).

15. The spring actuator according to claim 13, characterized in that the spring (13) is concentrically mounted to the guide pin (10) and to the hollow shaft (7) while being in contact with the peripheral internal face (7a) of the hollow shaft (7).

16. The spring actuator according to claim 13, characterized in that the end wall (8) of the hollow shaft (7) includes an orifice (16) letting through the guide pin (10).

17. The spring actuator according to claim 13, characterized in that the covering element (3) is a lid.

18. Roadway equipment comprising a covering element (3), pivotally mounted relatively to an edge (2a) of a frame (2) mounted and secured to the ground or to a roadway, and a device for assisting the opening of the covering element (3) between a lowered position for closing the frame (2) and a raised position for opening the frame, the device comprising at least a spring actuator (6) the two ends of which are connected and jointed respectively with the covering element (3) and with the edge (2a) of the frame (2), characterized in that the spring actuator (6) comprises a hollow shaft (7), an end wall (8) of which includes an external yoke (9) connected and jointed with the covering element (3) or with the edge (2a) of the frame (2), a guide pin (10) accommodated in the hollow shaft (7) and connected at its end opposite to the end wall (8) of the hollow shaft (7) to the edge (2a) of the frame (2) or to the covering element (3) through a jointing yoke (11), a spring (13) accommodated in the hollow shaft (7) while surrounding the guide pin (10), said spring (13) being pre-stressed in an unloaded state all along the guide pin (10) between the end wall (8) of the hollow shaft (7) and the yoke (11) of the guide pin (10), a length portion (10a) of which protrudes from the hollow shaft (7), when the covering element (3) occupies its raised opening position, and said spring (13) being compressed in the hollow shaft (7) between the end wall (8) of the hollow shaft (7) and the yoke (11) of the guide pin (10) when the covering element (3) occupies its lowered closing position and a means (14) secured to one of the ends of the guide pin (10) for retaining the spring (13) pre-stressed in the unloaded state, and in that, during the assisted opening of the covering element (3) by the spring actuator (6), the spring (13) is released in order to cause guided sliding of the hollow shaft (7) by the guide pin (10).

* * * * *